US010488909B2

(12) United States Patent
Biggs et al.

(10) Patent No.: US 10,488,909 B2
(45) Date of Patent: Nov. 26, 2019

(54) COMMUNICATING COMMANDS TO AN EMBEDDED CONTROLLER OF A SYSTEM

(71) Applicant: Hewlett-Packard Development Company, L.P., Houston, TX (US)

(72) Inventors: Kent E Biggs, Tomball, TX (US); Jeffrey K Jeansonne, Houston, TX (US); Robert C Brooks, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 157 days.

(21) Appl. No.: 15/118,201

(22) PCT Filed: Feb. 14, 2014

(86) PCT No.: PCT/US2014/016407
§ 371 (c)(1),
(2) Date: Aug. 11, 2016

(87) PCT Pub. No.: WO2015/122903
PCT Pub. Date: Aug. 20, 2015

(65) Prior Publication Data
US 2017/0177058 A1 Jun. 22, 2017

(51) Int. Cl.
*G06F 1/32* (2019.01)
*G06F 1/3209* (2019.01)
*G06F 9/4401* (2018.01)
*G06F 1/26* (2006.01)

(52) U.S. Cl.
CPC .......... *G06F 1/3209* (2013.01); *G06F 9/4418* (2013.01); *G06F 1/26* (2013.01)

(58) Field of Classification Search
CPC .............................. G06F 1/3209; G06F 9/4418
USPC ....................................................... 713/100
See application file for complete search history.

(56) References Cited

U.S. PATENT DOCUMENTS

| | | | |
|---|---|---|---|
| 7,349,967 B2 | 3/2008 | Wang | |
| 7,624,452 B2 | 11/2009 | Young et al. | |
| 8,073,954 B1* | 12/2011 | Tu | H04L 29/06 709/203 |
| 8,347,355 B2 | 1/2013 | Mower et al. | |
| 8,442,560 B1 | 5/2013 | Kiraly et al. | |
| 8,806,597 B2* | 8/2014 | Iwasaki | H04L 63/0823 726/7 |
| 9,104,488 B2* | 8/2015 | Chu | G06F 9/5022 |
| 2005/0226178 A1 | 10/2005 | Forand et al. | |
| 2006/0100724 A1* | 5/2006 | Miura | H04N 1/00209 700/82 |

(Continued)

OTHER PUBLICATIONS

"Are Macs safe from viruses and hackers?," Sep. 8, 2013, pp. 1-8, Rixstep, Available at: <rixstep.com/2/20130908.00.shtml>.

(Continued)

*Primary Examiner* — Volvick Derose
(74) *Attorney, Agent, or Firm* — HP Inc. Patent Department

(57) ABSTRACT

A system in accordance with an example includes a communication module and an embedded controller. The communications module is to connect to a server. The embedded controller is to communicate with the server to receive a command and to initiate a power state transition of the system in response to the command.

14 Claims, 5 Drawing Sheets

(56) References Cited

U.S. PATENT DOCUMENTS

| | | | |
|---|---|---|---|
| 2006/0112171 A1* | 5/2006 | Rader | H04L 63/102 709/218 |
| 2007/0067445 A1* | 3/2007 | Vugenfirer | H04L 67/141 709/224 |
| 2008/0162958 A1* | 7/2008 | Bozek | G06F 1/3209 713/310 |
| 2009/0063878 A1* | 3/2009 | Schmidt | G06F 1/3209 713/310 |
| 2009/0172443 A1* | 7/2009 | Rothman | G06F 1/3209 713/323 |
| 2009/0327468 A1* | 12/2009 | Hirsch | G06F 9/54 709/223 |
| 2010/0042710 A1 | 2/2010 | Lin | |
| 2011/0153784 A1* | 6/2011 | Sakata | G06F 1/3203 709/219 |
| 2011/0302278 A1* | 12/2011 | Shim | H04L 12/12 709/219 |
| 2012/0059955 A1* | 3/2012 | Anbarasu | G06F 1/3209 710/15 |
| 2012/0137146 A1* | 5/2012 | Karanth | G06F 1/3209 713/310 |
| 2012/0174189 A1* | 7/2012 | Lim | H04L 63/067 726/3 |
| 2012/0196571 A1 | 8/2012 | Grkov et al. | |
| 2012/0297212 A1* | 11/2012 | Belali | G06F 1/3209 713/310 |
| 2013/0137376 A1 | 5/2013 | Fitzgerald et al. | |
| 2013/0325998 A1 | 12/2013 | Hormuth et al. | |
| 2014/0012993 A1* | 1/2014 | Jallapelli | H04L 29/08153 709/226 |
| 2014/0129861 A1* | 5/2014 | Capuozzo | G06F 1/3234 713/323 |
| 2014/0298066 A1* | 10/2014 | Zhang | H04L 12/12 713/323 |
| 2015/0026491 A1* | 1/2015 | Park | H04L 12/12 713/310 |
| 2016/0082952 A1* | 3/2016 | Kang | B60W 30/00 701/2 |

OTHER PUBLICATIONS

HP iLO 3 User Guide—Mar. 2014—the first 11 pages of 256.

X. Beharry et al., "Phoning Home: Bridging the Gap between Conservation and Convenience," May 2, 2012, pp. 1-6, Software Engineering 2012, 2(1).

* cited by examiner

COMMUNICATING COMMANDS TO AN EMBEDDED CONTROLLER OF A SYSTEM

BACKGROUND

Personal computing devices such as desktops, notebooks, and tablets may enter a sleep mode, hibernation mode, or other low power modes to conserve power and to extend the battery life of the computing device. By entering the low power mode, the computing device can easily resume operational mode (or power on/working mode), thereby avoiding having to reissue instructions or to wait for the computing device to reboot.

BRIEF DESCRIPTION OF THE DRAWINGS

Some examples of the present application are described with respect to the following figures.

DETAILED DESCRIPTION

Figure 1:
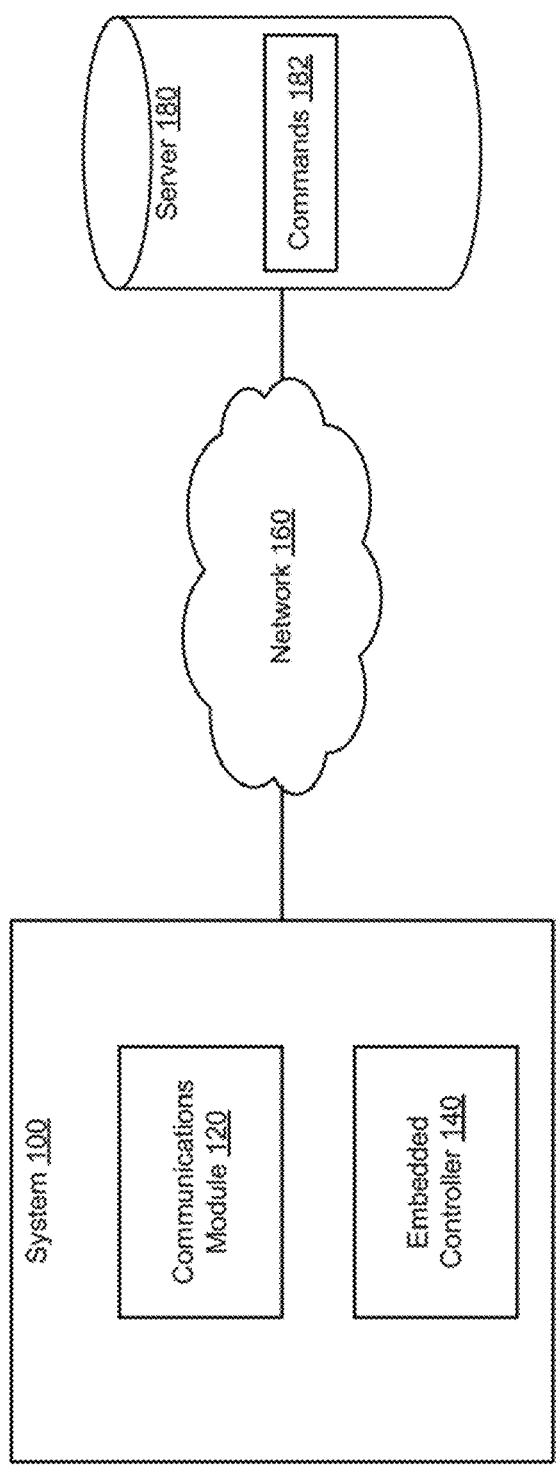
FIG. 1 illustrates an example of a system including a communications module and an embedded controller to receive and execute commands from a server.

Many personal computer (PC) users leave their PCs running all the time so that the PC is accessible to the user from a remote location. For example, a user may leave their work PC running so that the PC is constantly available/accessible whenever the user needs to work remotely (e.g., from home or while traveling). The PC can be placed in a low power mode or enter a low power mode after a period of inactivity. A low power mode can include, for example, an advanced configuration and power interface (ACPI) sleep state such as a S3 sleep state (or standby, sleep, or suspend to RAM), an S4 sleep state (or hibernation or suspend to disk), or S5 sleep state (or soft off). Thus, the PC is able to resume or transition to an operational mode faster (compared to powering off the system) without having to reboot.

Therefore, a user that desires remote access to their PC may allow the PC to enter the low power state so that the PC can easily be awakened when the user needs to access the PC. Wake-on-LAN (WOL) is an Ethernet computer networking standard that allows a computer to be turned on or awakened by a network message. The message is usually sent by a program executed on another computer on the same local area network (LAN) as the target computer. It is also possible to initiate the message from another network by using a subnet directed broadcast or a WOL gateway service.

However, the WOL feature may not be robust and may not provide a consistent solution for remotely waking a PC. For example, it may be difficult to remotely wake a PC that is inside a firewall, such as in cases where a user at home wants to wake a work PC or wants to wake a home PC from a remote location. In such examples, the WOL solution requires a management agent to cause a proxy unit inside the firewall on the same subnet to forward the WOL packet to the target PC. This may only work if there is at least one PC/proxy on the same subnet that forwards the WOL packet to the target PC and is itself awake (e.g., in the ACPI S0 state, power on, or working state). Accordingly, the WOL solution may not be a feasible solution for a user that has a single PC in a home or small office environment where the target PC is the only device present. Solutions that are unique to a particular platform (or vendor), that only work within an intranet and do not manage devices outside the intranet, that require knowledge of the location of the target PC, and or that require costly infrastructure, may be undesirable for remotely waking a PC.

The described examples address the above concerns by providing a solution where an embedded controller (EC) of a system establishes a session with a server on a network (e.g., public Internet) to request pending commands sent by a remote user to the system via the server. Upon receiving the request from the system, the server responds with actions/commands that the system should take such as an instruction to wake the system. Once the system is awakened, the user may then access the system remotely.

In a remote wake case, the server can respond with a "wake" command to indicate that the EC should initiate a power state transition from a low power (e.g., S3, S4, or S5 state) to a power on state (e.g., S0 state). In another example, if the system has been stolen, the server can respond with a "lock" or "wipe" command, causing the EC to initiate locking of the system to prevent access or a wiping of memory/storage devices of the system to prevent access/theft. In yet another example, if no action is required, the server can respond with a "do nothing" command, causing the system to remain in its current state and/or take no action.

In one example, a method for communicating with a system remotely includes establishing, by an embedded controller of the system, a communication session with a server via a network connection to request pending commands. The method includes receiving at least one command from the server and transitioning the system from one power state to another power state in response so the at least one command.

In another example, a system includes a communications module to connect to a server. The system also includes an embedded controller to communicate with the server to receive a command, the embedded controller further to initiate a power state transition of the system in response to the command.

In another example, a non-transitory computer-readable storage medium includes instructions that, if executed by an embedded controller of a computing system, cause the controller to establish a communication session with a server via a network connection to request pending commands. The instructions are also executable to receive at least one command from the server, and to transition the computing system from one power state to another power state, in response to the at least one command.

Referring now to the figures, FIG. 1 is an example of a system including a communications module and an embedded controller to receive and execute commands from a server. System 100 can be a personal computing system such as a desktop, a laptop, a tablet, a hybrid portable computing device, or any other personal computing device that includes an embedded controller (EC) 140. Further, system 100 can be a server, a personal digital assistant (PDA), a mobile phone or smartphone, a portable reading device, or any other processing device with an EC 140.

Communications module 120 includes a combination of software and hardware for transmission and reception of data. For example, communications module 120 may include a wireless radio for communicating wirelessly with a server 180 over a network 160. Thus, communications module 120 may use wireless communications protocols/standards/techniques such as Wi-Fi, Bluetooth, satellite, terrestrial, cellular (e.g., 3G, 4G, LTE, etc.), etc. to communicate with the server 180. In such an example, communications module can connect to the network 160 via a wireless access point (AP).

In other examples, communications module 120 may be a wired/cable media such as fiber optic, coaxial cable, twisted pair, Ethernet cable, etc. to communicate with the server 180. In such an example, communications module 120 can connect to a backend infrastructure using a cable, where the backend infrastructure is connected to the network 160. Thus, in the described examples, communications module 120 can connect via wireless media or cabled media to the network 160 for access to the server 180. In some examples, the network 160 includes a public network such as the Internet System 100 also includes an embedded controller 140. Embedded controller 140 can be a combination of hardware and software to manage certain functionality of the system 100. For example, the embedded controller 140 can manage power supply to the system 100 or components of the system 100. Thus, the embedded controller 140 can transition the system 100 from one power state (e.g., ACPI power state) to another power state by controlling power to the system 100 (or components therein) from a power supply (not shown). The power supply may include as alternating current (AC) power supply, a direct current (DC) power supply, or a combination thereof.

Server 180 can be any infrastructure for providing services to web-connected client devices such as system 100. Thus server 180 represents generally any computing device that responds to network requests from system 100 and that is accessible to system 100 over a network such as the Internet.

As explained above, a user may place the system 100 in a low power state (e.g., S3, S4, or S5) so that the user can access the system 100 remotely at a later time. Alternatively, the user may leave the system 100 running and the system 100 may, by itself, enter the low power state after a period of inactivity. By entering the low power state instead of shutting off/down, the user can remotely access the system 100. To remotely access the system 100, the user can send a wake command or other commands to the system 100 from a second system at a remote location through the server 180. In some examples, the commands 182 can be received and stored at the server 180 until requested by the system 100.

System 100 can periodically connect (e.g., via the Internet) to the server 180 to request pending commands 182 sent by the user. As used herein, "pending commands" are commands that may have been sent from the user to the server 180 prior to the system 100 establishing a connection with the server 180. Accordingly, when the system 100 connects with the server 180, the system 100 can request and receive such pending commands 182. In certain examples, the location (e.g., IP address) of the server 19 is known to the system 100. However, the location and/or IP address of the system 100 may be unknown to the server 180. Thus, the system 100 can send a request for commands to a server at a known location, thereby providing a secure remote access, eliminating the subnet limitation of WOL solution, providing adaptability with any platform regardless of vendor, providing access to the system even when WOL is disabled on the system, and enabling mobility of the system (because the user can access the system from anywhere). System 100 can be configured to periodically connect to the server 180 to retrieve pending commands 182 in predetermined time intervals such as seconds, minutes, or hours.

Embedded controller 140 establishes a session with the server 180 on the network 160 to request pending commands 182. For example, the embedded controller can instruct the communications module 120 to connect with the server 180 over the network 160. Upon receiving the request from the embedded controller 140, the server 180 can respond to the embedded controller 140 with actions that the system 100 should take. In one example, if the user wishes to access the system 100 from the remote location to do work, the server can respond with a wake command to indicate that the embedded controller 140 should initiate a power state transition from a low power state to the power on state. After the system 100 enters the power on state, the user can access the system 100 directly from a second system at the user's remote location. In another example, if the client has been stoles the user can send a "lock" or "wipe" command which is transmitted from the server 180 to the system 100 to lock the system to prevent unwanted access to the system or to wipe a memory/storage device of the system, respectively. In yet another example, the user may not send any command to the system via she server, and the server 180 can respond with a command to take no action. In this example, the embedded controller 140 can leave the system 100 in its current power state.

Figure 2:
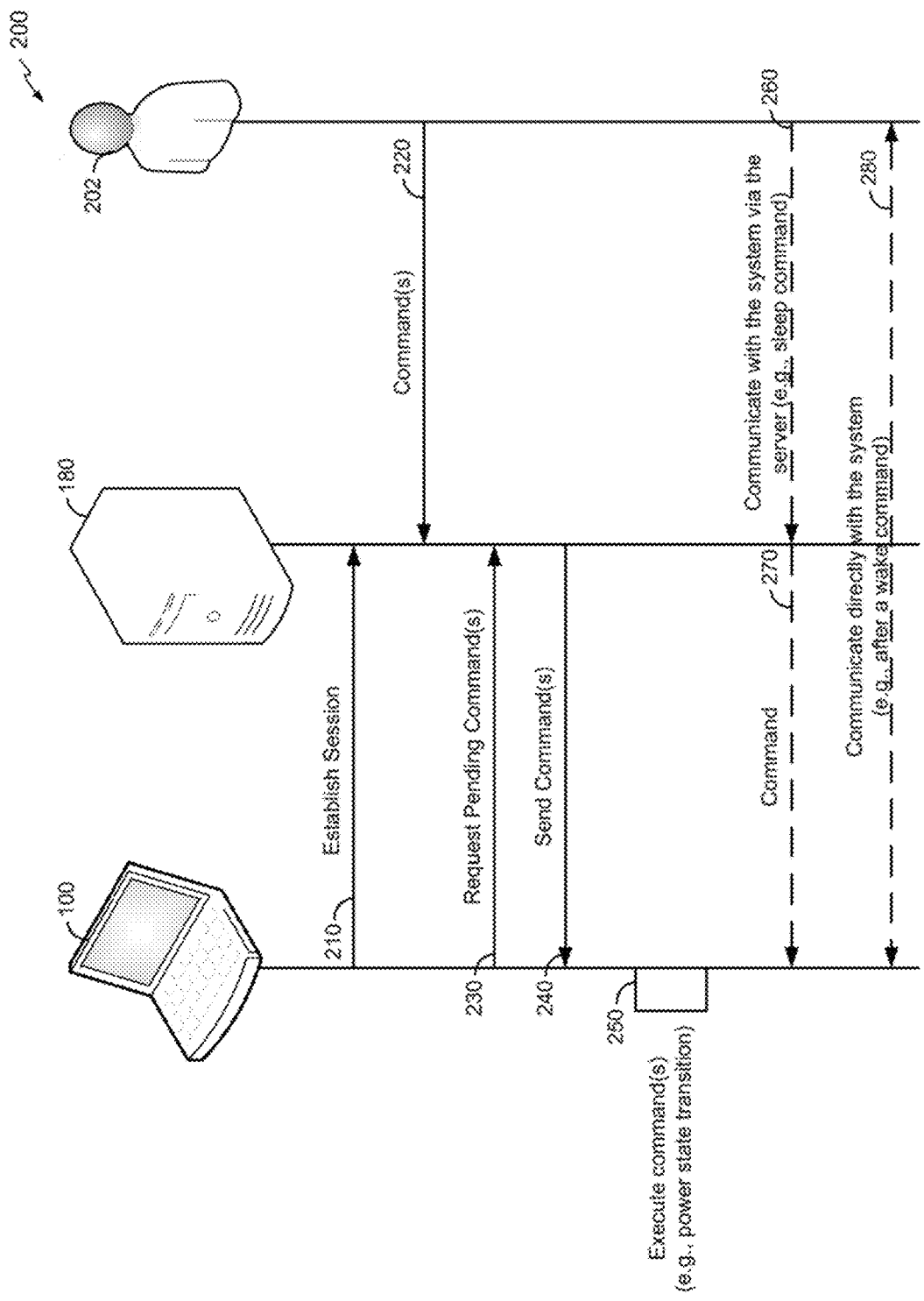
FIG. 2 illustrates an example of a communication flow from a remote user to a system via a server.

FIG. 2 is an example of a communication flow from a remote user to a system via a server. Flow diagram 200 includes the system 100, server 180, and a user 202. At 210, embedded controller 140 of the system 100 can establish a communication session with the server 180. For example, embedded controller 140 can establish a session with the server 180 on the Internet. At 220, the user 202 can send a command to the server 180. For example, user 202 can use a second system to send a command to the server 180, for transmission to the system 100. It should he noted that in certain examples, the command at 220 can be sent from the user before the system 100 establishes a session with the server 180. In such examples, the commands 182 can be on the server 180 until the system 100 connects to the server 180 to request commands. At 230, the embedded controller 140 can request pending commands, if any, from the server 180. In response to the request, at 240, the server 180 can send the command to the embedded controller 140.

At 250, the embedded controller 140 can execute the command received from the server 180. In some examples, the command can include a wake command, a sleep command, a hibernation, a wipe command, a lock command, or any other command. In one example, if the command is a sleep command from the user, the sleep command is sent from the server 180 to the embedded controller 140, at 270. In another example, if the command is a wake command, the user is able to directly communicate, at 280, and access the system 100 after the wake command has been executed (e.g., at step 250) and the system 100 is awake or in a power on state. Accordingly, the user is able to use the system 100, access files, application, execute commands, etc. remotely, as though the user was in front of the system 100.

Figure 3:
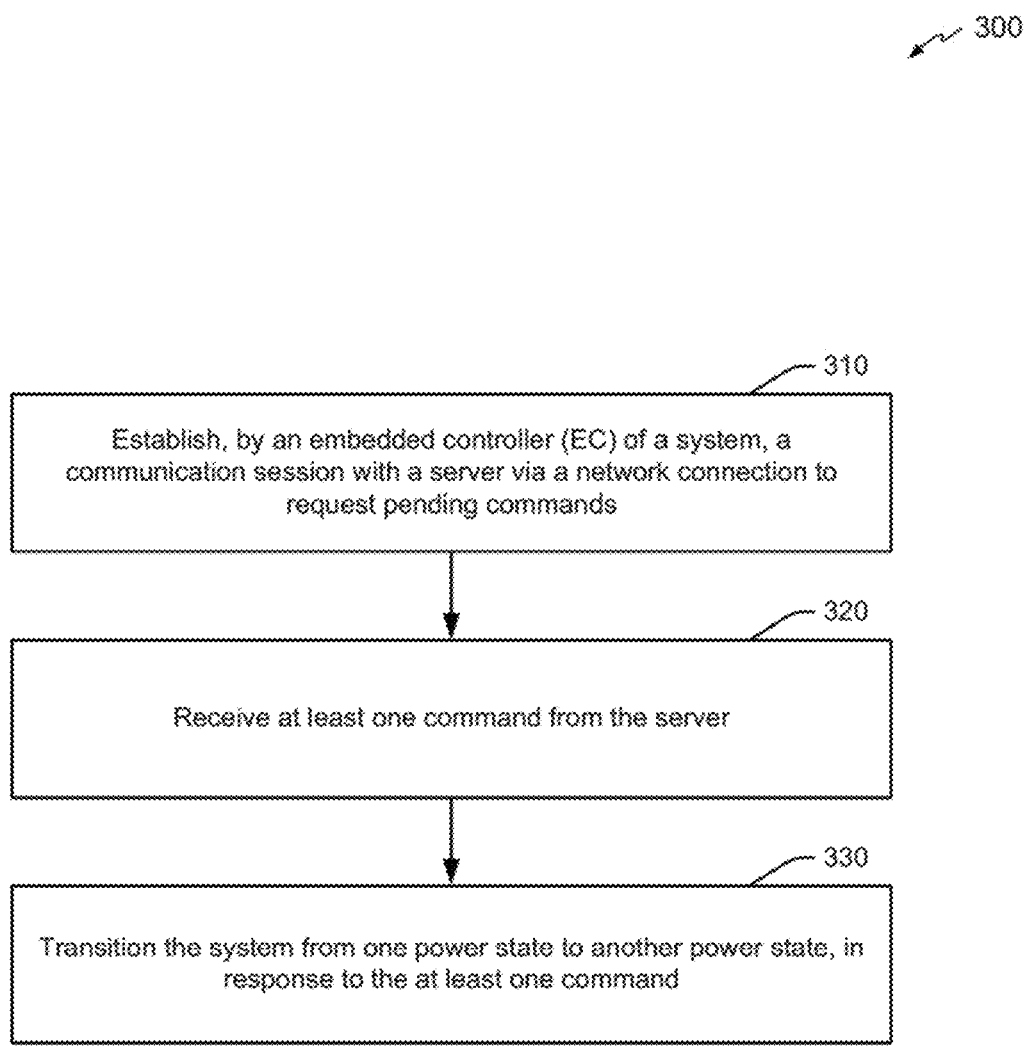
FIG. 3 is an example of a flowchart illustrating a method for communicating with a system remotely.

FIG. 3 is an example of a flowchart illustrating a method for communicating with a system remotely. Method 300 may be implemented, for example, in the form of executable instructions stored on a non-transitory computer-readable storage medium and/or in the form of electronic circuitry.

Method 300 includes establishing, by an embedded controller of a system, a communication session with a server via a network connection to request pending commands, at 310. For example, embedded controller 140 can establish a session with server 180 on a network 160 (e.g., Internet) to request commands from a remote user. Embedded controller 140 can be, for example, a processor, a semiconductor-based microprocessor, microcontroller, an integrated circuit (IC), or any other device suitable for controlling certain functionality of the system 100, such as power state transitions.

Method 300 includes receiving at least one command from the server, at 320. For example, the at least one command 182 can include a wake command, a sleep command, a lock command, a wipe command, a power state transition command (e.g., low power state or operational power state), or any other user command. In certain examples, the at least one command can include a command to the system 100 to take no action.

Method 300 includes transitioning the system from one power state to another power state, in response to the at least one command, at 330. For example, the embedded controller 140 can initiate a power state transition of the system 100 from one power state to another power state, such as transitioning from a low power state to a power on state. In some examples, the method 300 of FIG. 3 includes additional steps in addition to and/or in lieu of those depicted in FIG. 3.

Figure 4:
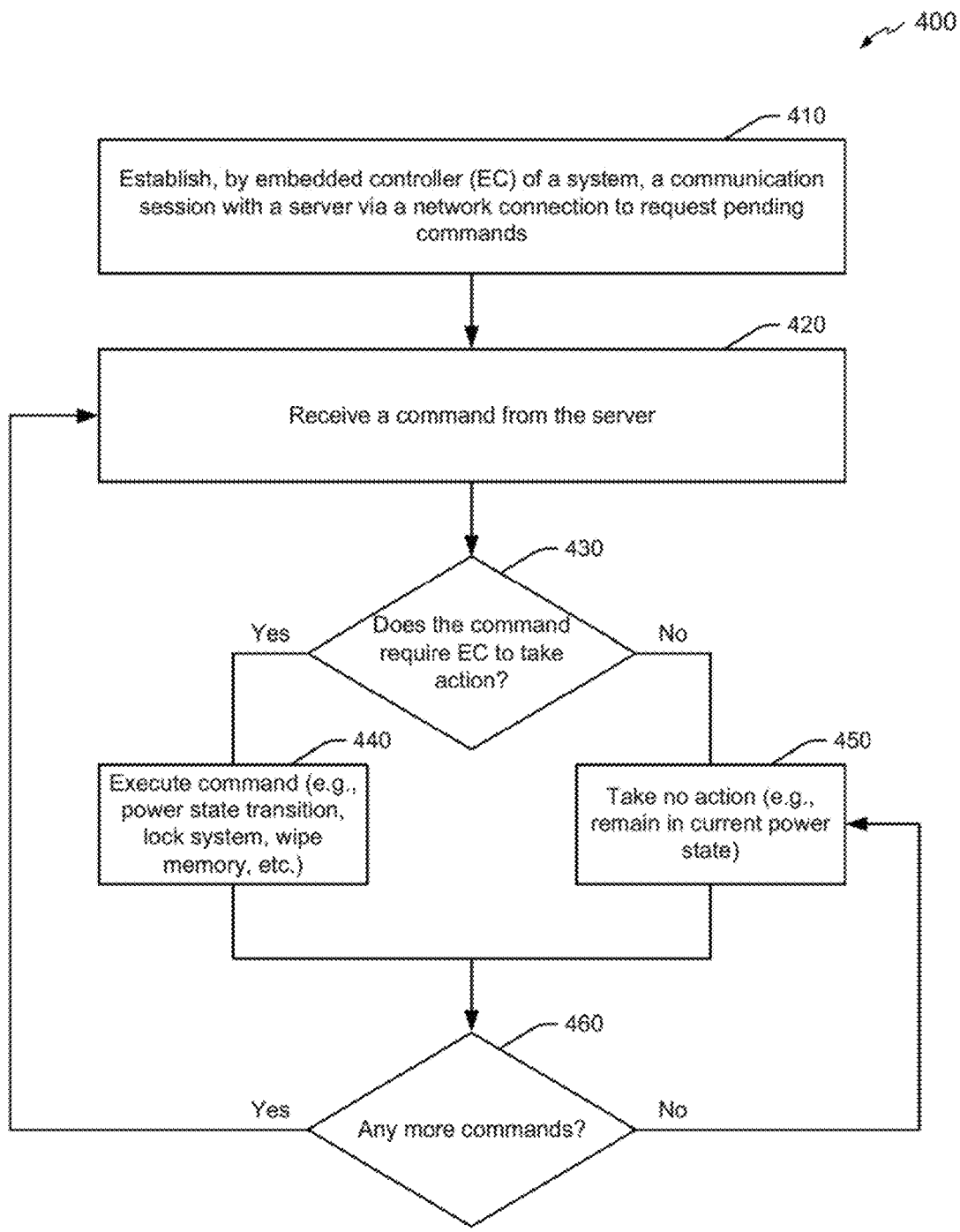
FIG. 4 is another example of a flowchart illustrating a method for communicating with a system remotely.

FIG. 4 is another example of a flowchart illustrating a method for communicating with a system remotely. Method 400 may be implemented, for example, in the form of executable instructions stored on a non-transitory computer-readable storage medium and/or in the form of electronic circuitry.

Method 400 includes establishing, by an embedded controller of a system, a communication session with a server via a network connection to request pending commands, at 410. For example, embedded controller 140 can establish a session with server 180 on a network 160 (e.g., Internet) to request commands from a remote user.

Method 400 includes receiving a command from the server, at 420. For example, the command can include a wake command, a sleep command, any other power state transition command, a memory wipe command, a system lock command, or any other user command. In certain examples, the command can include a command for the system to take no action.

Method 400 includes determining whether the command requires the embedded controller 140 to take any action, at 430. If it is determined at 430 that the command requires the embedded controller to take an action, the command is executed, at 440. For example, the embedded controller 140 can execute the command by initiating a power state transition of the system 100. If however it is determined at 430 that the command does not require the embedded controller to take any action, the embedded controller takes no action, as 450. For example, the embedded controller 140 can leave the system 100 at a current power state.

Method 400 includes determining whether there are any more commands, at 460. If it is determined that there are more commands, method 400 proceeds to 420 where the command is received from the user. If however it is determined that there are no more commands, method 400 proceeds to 450 where the embedded controller 140 takes no action. In some examples, the method 400 of FIG. 4 includes additional steps in addition to and/or in lieu of those depicted in FIG. 4.

Figure 5:
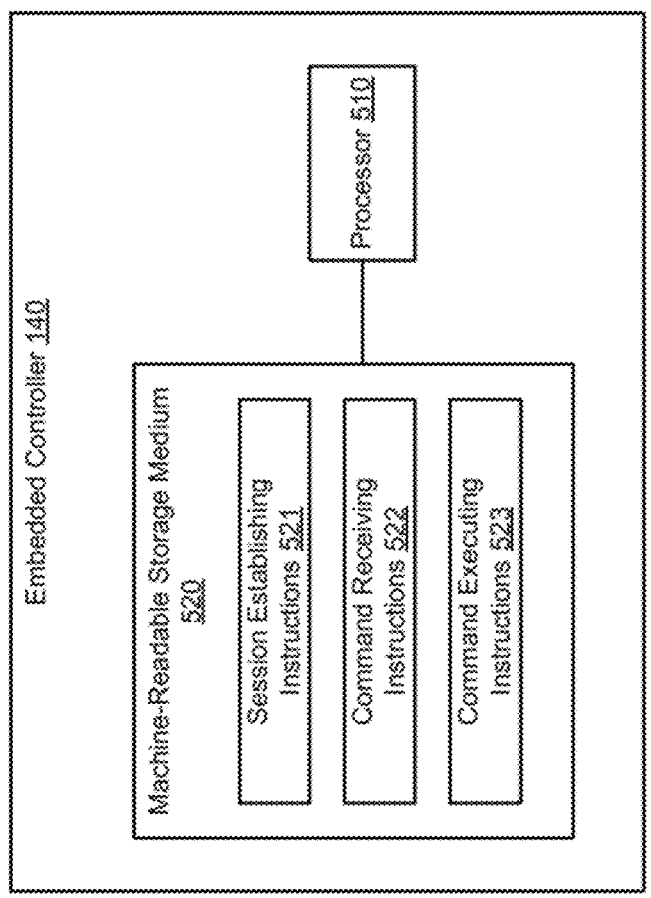
FIG. 5 illustrates an example of an embedded controller including a computer-readable medium having instructions to receive and execute commands from a remote server.

FIG. 5 illustrates as example of an embedded controller including a computer-readable medium having instructions to receive and execute commands from a remote server. Embedded controller 140 can include a non-transitory computer-readable medium 520. The non-transitory computer-readable medium 520 can include instructions 521-523 that if executed by a processor 510 can cause the embedded controller 140 to perform the functionality described below.

For example, session establishing instructions 521 are executable to establish a communication session with a server via a network connection to request pending commands. Command receiving instructions 522 are executable to receive at least one command from the server. Command executing instructions 523 are executable to transition the computing system from one power state to another power state, is response to the at least one command.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled m the art will appreciate numerous modifications and variations therefrom. It is intended that the appended claims cover such modifications and variations as fall within the true spirit and scope of the present disclosure.

What is claimed is:

1. A method for communicating with a first system remotely, comprising:
   establishing, by an embedded controller of the first system, a communication session with a server periodically via a network connection to request pending commands from a second system that is remotely located from the first system and the server, wherein a request is sent from the first system to the server due to a location of the server being known to the first system and a location of the first system being unknown to the server, wherein the location of the first system includes an internet protocol (IP) address of the first system, wherein the pending commands are sent by the second system while the first system is in a low power state;
   receiving at least one command from the server; and
   transitioning the first system from the low power state to another power state, in response to the at least one command.

2. The method of claim 1, wherein when the at least one command includes a wake command, the method comprises waking the first system from the low power state in response to the wake command.

3. The method of claim 1, further comprising causing the first system to enter the low power state or an operational power state in response to the at least one command.

4. The method of claim 1, wherein when the at least one command includes a lock command, the method comprises locking the first system to prevent access to the first system in response to the lock command.

5. The method of claim 1, wherein when the at least one command includes a wipe command, the method comprises wiping a memory of the first system to prevent access to files stored thereon in response to the wipe command.

6. The method of claim 1, wherein the at least one command is sent from a user remotely located from the first system via the server, wherein when the at least one command includes a wake command, the user communicates with the first system from the second system after the first system is waken from the low power state.

7. The method of claim 1, wherein when the at least one command includes an instruction to take no action, the method includes leaving the first system in a current power state.

8. A first system comprising:
a communications module to connect to a server; and
an embedded controller to:
establish a connection with the server periodically via the communication module, wherein a request is sent from the first system to the server due to a location of the server being known to the first system and a location of the first system being unknown to the server, wherein the location of the first system includes an internet protocol (IP) address of the first system;
transmit a request to the server for a command that is sent by a second system while the first system is in a low power state, wherein the second system is remotely located from the first system and the server;
receive the command from the server; and
initiate a power state transition of the first system in response to the command.

9. The system of claim 8, the communications module to connect to the server via a network connection, wherein the command is sent from a user to the first system via the server.

10. The system of claim 8, wherein the command includes a wake command to wake the first system from the low power state to a power on state.

11. The system of claim 8, wherein the command includes a sleep command to enter the low power state from a power on state.

12. The system of claim 8, wherein the embedded controller is to periodically communicate with the server to request pending commands.

13. A non-transitory computer-readable medium comprising code that, if executed by an embedded controller of a first computing system, causes the embedded controller to:
establish a communication session with a server periodically via a network connection to request pending commands from a second computing system that is remotely located from the first computing system and the server, wherein a request is sent from the first computing system to the server due to a location of the server being known to the first computing system and a location of the first computing system being unknown to the server, wherein the location of the first computing system includes an internet protocol (IP) address of the first computing system, wherein the pending commands are sent by the second computing system while the first computing system is in a low power state;
receive at least one command from the server; and
transition the first computing system from the low power state to another power state, in response to the at least one command.

14. The non-transitory computer-readable medium of claim 13, wherein the at least one command causes the controller to transition the first computing system from the low power state to an operational power state.

* * * * *